US010670746B2

(12) United States Patent
Hill

(10) Patent No.: US 10,670,746 B2
(45) Date of Patent: Jun. 2, 2020

(54) SAMPLE CONTAINER, SAMPLING SYSTEM, NUCLEAR POWER PLANT AND CORRESPONDING OPERATING METHOD

(71) Applicant: FRAMATOME GMBH, Erlangen (DE)

(72) Inventor: Axel Hill, Stockstadt (DE)

(73) Assignee: Framatome GmbH, Erlangen (DE)

( * ) Notice: Subject to any disclaimer, the term of this patent is extended or adjusted under 35 U.S.C. 154(b) by 23 days.

(21) Appl. No.: 15/966,774

(22) Filed: Apr. 30, 2018

(65) Prior Publication Data

US 2018/0246233 A1    Aug. 30, 2018

Related U.S. Application Data

(63) Continuation of application No. PCT/EP2016/074843, filed on Oct. 17, 2016.

(30) Foreign Application Priority Data

Oct. 29, 2015    (DE) ........................ 10 2015 221 151

(51) Int. Cl.
*G01N 1/10* (2006.01)
*G01T 7/02* (2006.01)
(Continued)

(52) U.S. Cl.
CPC ................. *G01T 7/02* (2013.01); *G01N 1/10* (2013.01); *G01N 1/14* (2013.01); *G01N 1/2202* (2013.01);
(Continued)

(58) Field of Classification Search
CPC .. G01T 7/02; G01T 7/08; G21C 17/00; G01N 2201/1454; G01N 2001/2238;
(Continued)

(56) References Cited

U.S. PATENT DOCUMENTS 5,402,454 A * 3/1995 Eckardt ................ G21C 17/028
376/245

FOREIGN PATENT DOCUMENTS

DE         3244514 A1    6/1984
WO         9816934 A1    4/1998

* cited by examiner

*Primary Examiner* — Daniel S Larkin
(74) *Attorney, Agent, or Firm* — Laurence A. Greenberg; Werner H. Stemer; Ralph E. Locher

(57) ABSTRACT

A sample container, sampling system and operating methods permit representative sampling from a liquid phase or boiling liquid, a gaseous phase, a containment sump, containment atmosphere, or condensation chamber of a nuclear power plant following a severe accident. A sample container obtaining an environmental sample includes an outer chamber surrounded by an outer container wall, being directly fluidically connected to the environment through a passage opening in the outer container wall and being fillable with a liquid at least in a base region. An inner chamber surrounded by an inner container wall is fluidically connected to the base region through a passage opening in the inner container wall, has connections for sampling and conveyor medium lines and is otherwise pressure and media tightly sealed from the environment. A pneumatically or hydraulically actuatable closure device for the passage opening between the outer and inner chambers has an actuation medium line connection.

20 Claims, 6 Drawing Sheets

(51) Int. Cl.
- *G01T 7/08* (2006.01)
- *G21C 19/00* (2006.01)
- *G21C 19/02* (2006.01)
- *G01N 1/14* (2006.01)
- *G01N 1/22* (2006.01)
- *G01N 1/24* (2006.01)
- *G21C 13/10* (2006.01)
- *G21C 17/00* (2006.01)
- *G21C 19/28* (2006.01)
- *G21C 19/307* (2006.01)

(52) U.S. Cl.
CPC ............ *G01N 1/2226* (2013.01); *G01T 7/08* (2013.01); *G21C 17/00* (2013.01); *G01N 2001/1037* (2013.01); *G01N 2001/1454* (2013.01); *G01N 2001/2223* (2013.01); *G01N 2001/2229* (2013.01); *G01N 2001/2238* (2013.01); *G01N 2001/242* (2013.01)

(58) Field of Classification Search
CPC ..... G01N 2001/242; G01N 2001/2229; G01N 2001/1037; G01N 1/2226; G01N 1/2202; G01N 2001/2223; G01N 1/14; G01N 1/10
USPC .......................................... 73/864.34, 864.63
See application file for complete search history.

SAMPLE CONTAINER, SAMPLING SYSTEM, NUCLEAR POWER PLANT AND CORRESPONDING OPERATING METHOD

CROSS-REFERENCE TO RELATED APPLICATION

This is a continuation application, under 35 U.S.C. § 120, of copending International Application PCT/EP2016/074843, filed Oct. 17, 2016, which designated the United States; this application also claims the priority, under 35 U.S.C. § 119, of German Patent Application DE 10 2015 221 151.7, filed Oct. 29, 2015; the prior applications are herewith incorporated by reference in their entirety.

BACKGROUND OF THE INVENTION

Field of the Invention

In a nuclear power plant, under incident or accident conditions, a potentially significant release of radioactive breakdown products (e.g. iodine, aerosols) and noble gases into the containment atmosphere and the containment sump, and/or into the condensation chamber in the case of a boiling water reactor, must be anticipated. Knowledge of the composition of breakdown products permits conclusions to be drawn with regard to the progress of an incident and provides a key basis for the implementation of any countermeasures. Moreover, the Fukushima incident, in particular, demonstrated that knowledge of the condition of fuel elements in the storage pond is also necessary for an appraisal of the state of the plant.

In the event of a release from the containment atmosphere, the iodine isotope 131 poses a particular radiological hazard to the environment. The successful management of severe incidents requires effective measures for the maintenance of any environmentally-hazardous concentration of volatile iodine in the containment atmosphere as low as possible, regardless of how the iodine has been generated and released.

That can be achieved by the breakdown and retention thereof in the containment sump in a non-volatile form. Insofar as possible, the binding of iodine in the liquid phase is preferred. Any release from the containment, for example as a result of leaks or during the filtered pressure relief of the containment (venting) is minimized accordingly.

The setting of a high pH value in the containment sump can achieve the inhibition and reduction of a radiological hazard potential. However, the pH value of the sump, specifically in the case of the release of chlorides in the event of an incident (e.g. a cable fire), can be negatively influenced with respect to its iodine retention capability. Knowledge of the current pH value in the sump, with respect to its role as a passive radioactivity sink, is therefore of critical significance in incident management, and for the timing of the targeted implementation of countermeasures for the retention of radioactivity.

Any direct installation of measuring sensors in the respective fluid within the containment is generally balked at by the severe loading of the sensor and its electronics associated with radiation, aerosols, humidity, pressure and temperature, and by the unavailability, or only limited availability of incident-proof cables for measuring signals and power supplies.

In general, for the determination and appraisal of variable installation parameters, the retrieval of a representative liquid and/or gaseous sample from the various reservoirs within the containment is therefore required. Those representative samples can then be investigated with respect to the relevant parameters, including chemical parameters (e.g. pH value), or for specific radionuclides or quantities of aerosols, outside the containment.

Existing concepts provide, for example, for sampling from a sample container, which is located in the containment atmosphere or in the containment sump.

According to the devices and methods described in European Patent EP 0931317 B1, the sample is extracted and conveyed by using a pressure pulse. To that end, sampling lines must be disposed with a constant gradient, with no low points. There is a further disadvantage, in that the conveyance of samples by that special pressure pulse technique is only possible for a limited length of sampling line (<80 m). The conveyance of samples additionally requires a large buffer volume, in relation to the return container. That method further requires the heating of sampling lines, if a gaseous sample is to be extracted from the containment. That is necessary for the prevention of any vapor condensation, in such a way that the quantity carried by the sampler can be correctly identified. For the same reason, the scrubbing liquid to be introduced into the sampler must also be heated prior to the introduction thereof, thereby resulting in a substantial complexity of apparatus and high electricity consumption. Consequently, the installation site of sample evaluation equipment must always be located in the immediate vicinity of the containment, in order to allow the length of lines to be maintained as short as possible.

Further specific requirements to be considered are posed by the extraction of aerosol samples and by the extraction of liquid samples from boiling liquids.

Due to the grounds of aerosol deposition during the conveyance thereof in sampling lines, the extraction of representative aerosol samples for the evaluation of the release of radioactivity is only possible if aerosols are directly transferred to a scrubbing liquid at the site of sampling, with which they can then be conveyed, in solution, over long distances, with no significant deposition on the interior of the lines.

Likewise, the secure extraction of representative liquid samples from boiling liquids, which are to be conveyed to an evaluation unit over long distances (e.g. >100 m), can only be achieved with difficulty by using conventional sampling equipment.

BRIEF SUMMARY OF THE INVENTION

It is accordingly an object of the invention to provide a sample container, a sampling system, a nuclear power plant and a corresponding operating method, which overcome the hereinafore-mentioned disadvantages of the heretofore-known devices and methods of this general type and with which a representative sample can be extracted from a liquid phase, in particular from a boiling liquid, and from a gaseous phase, in particular from a containment sump, the containment atmosphere or the condensation chamber of a nuclear power plant, following a severe incident. In particular, it is intended that small sample quantities should be conveyed to an external analysis device, with low energy consumption, over long distances (>100 m) with no significant deposition on the walls of the sampling line.

With the foregoing and other objects in view there is provided, in accordance with the invention, a sample container for obtaining an environmental sample, comprising:

an outer chamber which is surrounded by an outer container wall, which is directly fluidically connected to the environment through at least one passage opening disposed in the outer container wall, and which can be filled with a liquid, at least in a base region, an inner chamber which is surrounded by an inner container wall, which is fluidically connected to the base region of the outer chamber through a passage opening disposed in the inner container wall, and which has a connection for a sampling line and a connection for a conveyor medium line and is otherwise sealed from the environment in a pressure-tight and media-tight manner, a pneumatically or hydraulically actuatable closure device for the passage opening between the outer chamber and the inner chamber with a connection for an actuation medium line, and the passage opening from the outer chamber to the inner chamber being configured as a Venturi nozzle.

With the objects of the invention in view, there is also provided a sampling system having a sample container according to the invention, to the inner chamber of which a sampling line connected to a vacuum pump and a conveyor medium line connected to a compressed gas source are connected, and on the closure device of which an actuation medium line connected to a compressed gas source is disposed.

With the objects of the invention in view, there is furthermore provided a nuclear power plant having a safety containment and having a sampling system according to the invention, wherein at least one sample container is disposed in the interior of the safety containment, and wherein an associated process and analysis module is disposed outside the safety containment.

With the objects of the invention in view, there is additionally provided a method for operating a sampling system according to the invention wherein, in the event of an open passage opening between the outer chamber and the inner chamber, a gas sample is extracted by the application of a negative pressure to the sampling line.

With the objects of the invention in view, there is concomitantly provided a method for operating a sampling system according to the invention, wherein in the event of a closed passage opening between the outer chamber and the inner chamber, a fluid sample is compressed through the sampling line by the application of an overpressure to the conveyor medium line.

The sample container is located in the medium to be sampled, for example in the containment of a nuclear power plant, and is integrated in the sampling system by using associated lines. Sampling is thus executed in situ. The conveyance of samples to the external process and analysis module is executed by the application of a negative pressure, in the case of gas sampling, and by using an inert conveyor gas/transport gas, specifically nitrogen, in the case of liquid sampling. Liquid samples can be conveyed over a long distance, since the sample container is equipped with a preferably automatically-operated closing mechanism. Conversely to the above-mentioned pressure pulse technology from the prior art, a continuous conveyor pressure can thus be provided. Aerosol samples are incorporated into a scrubbing liquid, preferably by using the through flow thereof in a Venturi nozzle, which is introduced into the sample container. The aerosol sample is then conveyed as a liquid sample, in the manner described. In the case of sampling from a sump, substantially passive sampling is possible, even from a boiling sump. For all of these processes, the same sample container can be employed, with no modifications.

In a preferred embodiment, heat is transferred from the environment, for example from the containment atmosphere, to the sample container by using passive thermal conduction pipes. Accordingly, there is no further need for the active heating of the scrubbing liquid prior to the introduction thereof into the sample container, as previously, in order to prevent vapor condensation in the scrubbing liquid.

In an advantageous configuration, any heating of the sampling lines outside the containment can also be omitted, since the proportion of water vapor lost in the sampling line outside the containment can be determined with reference to the passive maintenance of a constant volumetric flow which is achieved by using a supercritical flow-through choke valve/nozzle. The respective volumetric flow in the Venturi nozzle/of the scrubbing liquid can be determined accordingly, and the externally-measured radioactivity can be related to the volume in the containment.

In a preferred variant, an environmental response at the location of sampling can also be achieved by using the lines in the sampling system, for example for the conditioning of the pH value by the injection of corresponding chemicals. Through the use of a targeted adjustment/compensation of this type, a significant reduction in the release of radioactivity can be achieved in the event of a severe incident in a nuclear power plant.

Key advantages of the concept according to the invention can be summarized by the following bullet points:

Option for the sampling of boiling liquids, e.g. in the containment sump

In situ measurement, with no corruption of the sample

Achievement of long transport routes >100 m

Loss-free conveyance of samples, with reduced deposition of aerosols in the transmission line Option for the connection of a mobile process and analysis module to a pre-installed permanent line system No requirement for a return module, with a return container Installation of measuring devices in a radiation-protected environment, specifically outside the containment Superior reliability of measurement Good accessibility of measuring devices for maintenance during the normal duty of the installation Semi-passive conveyance of samples by using a pressurized conveyor gas Low energy consumption—system operation and measuring functions can be maintained by battery operation Lines of small cross-section, with a consequent reduction in leaks in the event of line failures.

Other features which are considered as characteristic for the invention are set forth in the appended claims.

Although the invention is illustrated and described herein as embodied in a sample container, a sampling system, a nuclear power plant and a corresponding operating method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DETAILED DESCRIPTION OF THE INVENTION

In the interests of simplicity, the positional and directional indications employed refer in all cases to the customary position of installation of components in regulation use, as represented in the figures.

Figure 2:
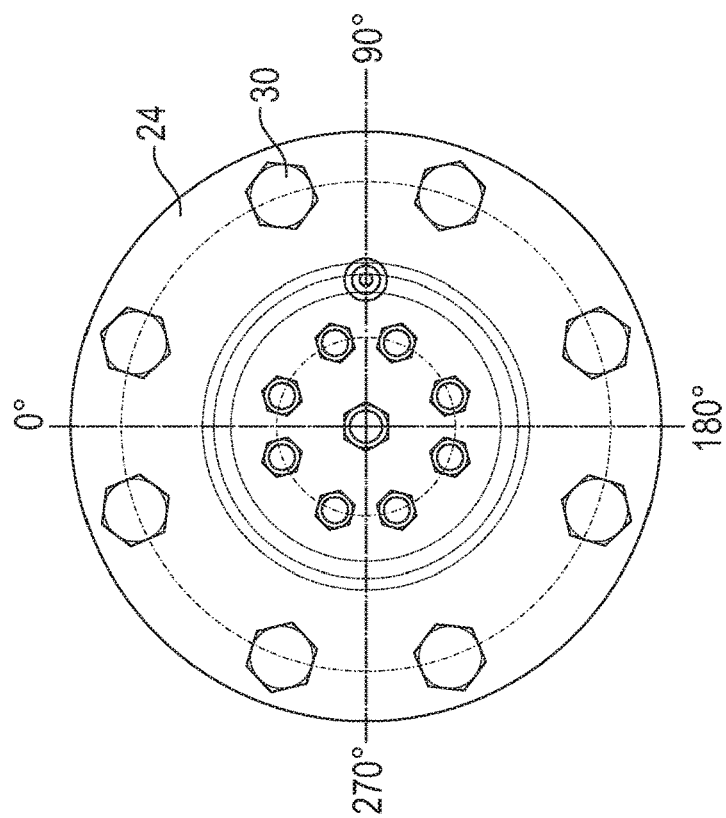
FIG. 2 is a top-plan view of the sample container.
Figure 1:
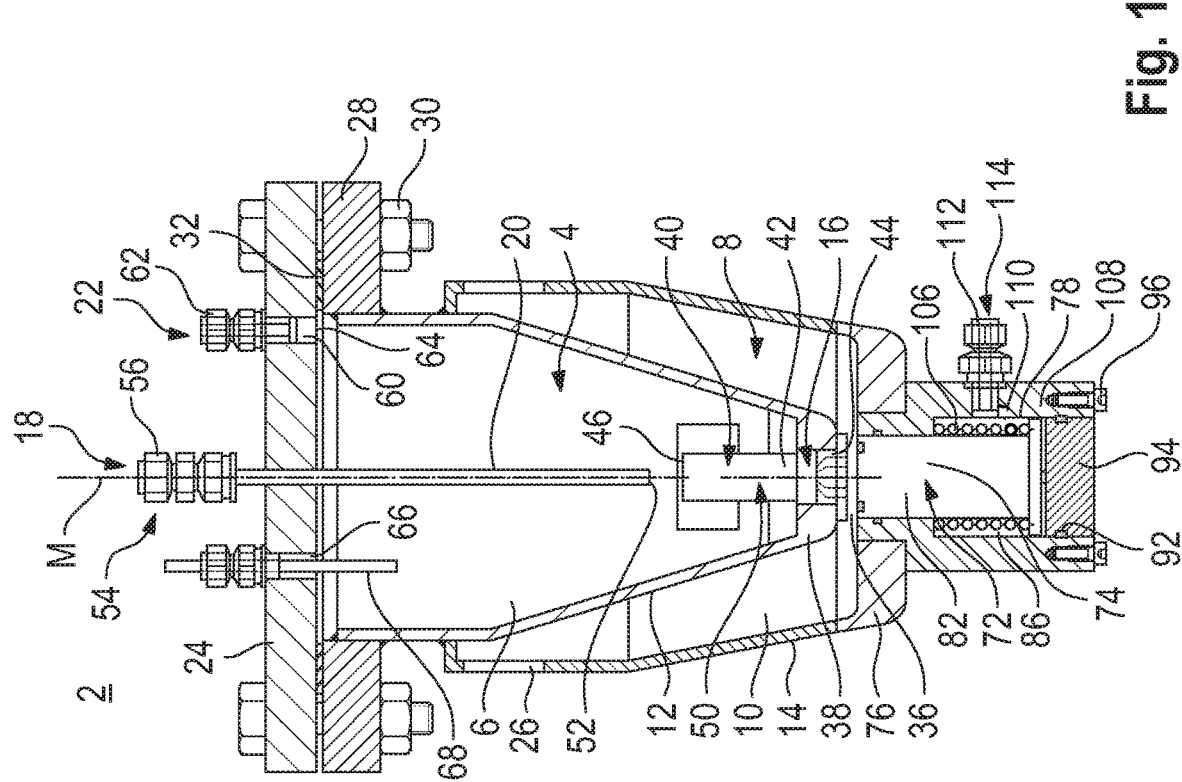
FIG. 1 is a diagrammatic, longitudinal-sectional view of a sample container for the acquisition/extraction of an environmental sample, specifically from the atmosphere or from a liquid pond in a nuclear installation.

Referring now in detail to the figures of the drawings, in which identical or identically-acting elements are identified by the same reference symbols, and first, particularly, to FIG. 1 thereof, there is seen a longitudinal section of a sample container 2, also designated as a sampling probe or sampling vessel, or sampler for short, for the acquisition of an environmental sample, specifically in a nuclear installation. FIG. 2 shows an associated overhead view.

The sample container 2 includes an inner container 4 having an inner chamber 6, and an outer container 8 having an outer chamber 10, which are separated from each other and from the external environment by separating or enclosing walls. The inner container 4, which is enclosed by an inner container wall 12, projects from above into the outer container 8, which is enclosed by an outer container wall 14, in such a way that the outer chamber 10 is configured, in sections, in the form of an annular chamber surrounding the inner chamber 6. In the section represented, the inner container wall 12 simultaneously constitutes an inner boundary of the outer chamber 10. In its lower base region, the inner container wall 12 incorporates a closable passage opening 16 through which, in the open state, a fluid or flow medium or medium can flow from the base region of the outer chamber 10 into the inner chamber 6, or vice versa. A sampling line 18 having a riser 20 which projects from above into the inner chamber 6, and a conveyor medium line 22 are connectable to the inner container 4 by using appropriate connections in a cover plate 24. Otherwise, the inner chamber 6 is sealed from the outer chamber 10 and from the environment in a pressure-tight and media-tight manner. In an upper region, the outer container wall 14 incorporates passage openings 26 to the environment, the lower edges of which are disposed higher than the inlet of the passage opening 16 in the inner container wall 12. Accordingly—under appropriately-adjusted pressure conditions—a medium can flow from the environment through the passage opening 26 into the outer chamber 10, collect in the base region thereof and, where the passage opening 16 is open, flow into the inner chamber 6.

Specifically, the sample container 2 in the exemplary embodiment has a rotationally-symmetrical construction with respect to a central axis M which, in regulation duty, is vertically-oriented. In its upper region, the inner container 4 has a cylindrical construction, with a diameter tapering in the lower region to form a truncated cone. The outer container 8 has a similar construction to the inner container 4, but with a somewhat larger diameter, and encloses the lower region thereof to form an annular outer chamber 10 which is disposed concentrically to the inner chamber 6. On its upper side, the inner container 4 is closed by a cover plate 24. In the exemplary embodiment, the cover plate 24 is a component which cooperates with a circumferential flange 28 on the container vessel and is connected thereto by using (detachable) fixing bolts 30, wherein the requisite seal is provided by the interposition of sealing rings 32. On its upper side, the outer container 8 is flange-mounted onto the cylindrical side wall of the inner container 4. The passage openings 26 to the environment, disposed in the outer container wall 14, are positioned immediately below. Considered in the vertical direction, the bottom-most lower edge of the passage openings 26 is disposed with a clearance to the base of the inner container wall 12. Between the underside of the inner container wall 12, in the base region thereof, and the flat base of the outer container wall 14, in the longitudinal section according to FIG. 1, a gap 36 is disposed, which is configured for the through flow of a medium and which communicates with the closable passage opening 16 to the inner chamber 6. The medium entering the outer chamber 10 from the environment through the passage openings 26, specifically in a liquid form, can accumulate in the base region of the outer chamber 10, specifically in the gap 36 and, in the case of an open passage opening 16, can flow from there to the inner chamber 6, provided that the prevailing pressure therein permits.

In order to achieve the desired function, it is not absolutely necessary for the outer container 8 to enclose the inner container 4, at least not completely. It is sufficient for a fluidic connection to be established through the closable passage opening 16, through which the transition of gas can proceed in the form of a fluid column. Accordingly, the terms "inner" and "outer" are to be understood in the general sense.

Figure 3:
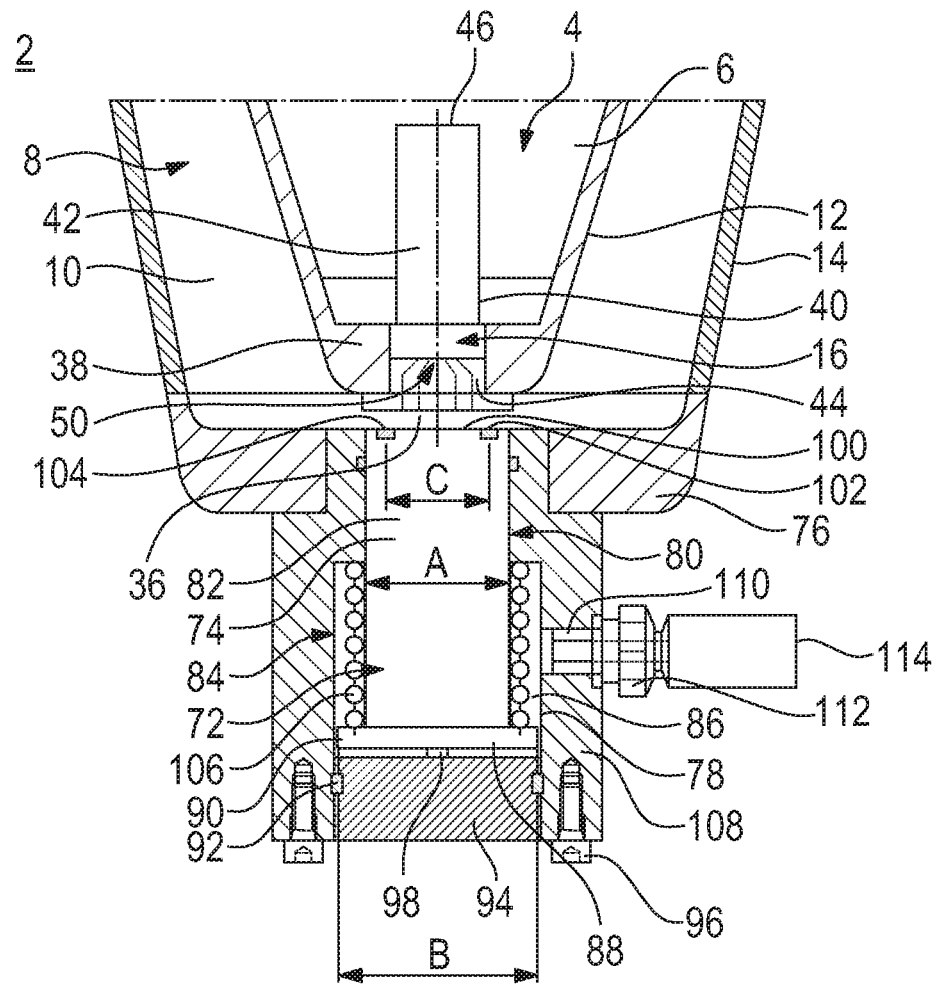
FIG. 3 is an enlarged, longitudinal-sectional view of the sample container of FIG. 1.
Figure 5:
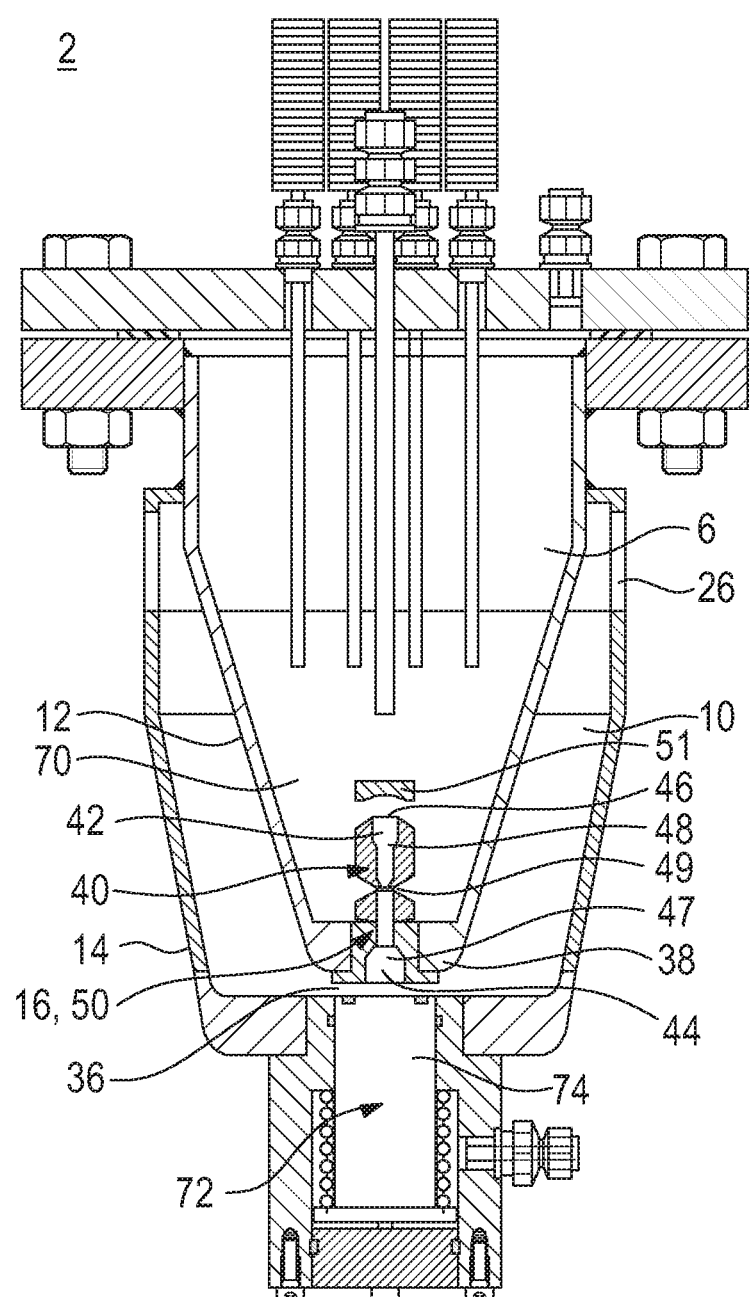
FIG. 5 is an enlarged, longitudinal-sectional view of the sample container during a sampling operation.

The closable passage opening 16, which can also be seen in further detail in FIGS. 3 and 5, includes a bore/recess in a base plate 38 of the inner container 4, and extends upwards within a short nozzle pipe 40 which, in a vertical orientation, projects to a certain degree into the inner chamber 6. At its lower end, the nozzle pipe 40 is inserted from above into the bore/recess or is otherwise flange-connected thereto in a pressure-tight and media-tight configuration. A flow channel 42 is thus formed, the intake/inlet opening 44 of which, subject to a direction of flow of the medium from the outer chamber 10 to the inner chamber 6, i.e. from bottom to top, is located on the underside of the base plate 38, and the discharge/outlet opening 46 of which is located at the upper end of the pipe 40. Although, under specific operating conditions, particularly upon entry into service, the direction of flow and thus the inlet and outlet functions can also be reversed (see below), the above-mentioned direction of flow, and the designations corresponding thereto, will apply in normal sampling duty.

In order to carry out the effective separation of aerosols during sampling in the liquid phase of the flowing medium, or in a separate scrubbing liquid, the passage opening 16 is configured in the manner of a Venturi nozzle 50, or incorporates/encompasses a nozzle of this type. To this end, as can be seen in FIG. 5, the flow channel 42 configured in the nozzle pipe 40, at its lower end, incorporates an upwardly-tapering inlet cone 47 and, at its upper end, incorporates an upwardly-expanding outlet cone 48. At the intervening bottleneck/constriction, over at least part of the circumference thereof, a preferably annular or arc-shaped intake slot 49 is disposed in the wall of the nozzle pipe 40 which, in the radial direction, fluidically communicates with the surrounding inner chamber 6. Through the use of the Venturi nozzle 50 thus formed, the medium flowing from the inlet opening 44 to the outlet opening 46 during sampling duty draws the surrounding fluid from the inner chamber 6 through the intake slot 49 and entrains the latter accordingly. This results specifically in an innate reciprocal action between the gaseous constituents of the flowing medium and the liquid phase. Any aerosols entrained in the gaseous phase of a medium are thus separated from the gaseous phase in a particularly effective manner and are introduced into the liquid phase. This effect is further enhanced by a baffle plate 51 disposed immediately above the outlet opening 46.

The riser 20 is routed through the cover plate 24 of the inner container 4 in a pressure-tight and media-tight configuration. The riser 20 disposed along the central axis M and thus, in normal duty, vertically-oriented, thus projects into the inner chamber 6 from above. An inlet 52 at the lower end of the riser 20 is disposed, with a degree of clearance, above the outlet opening 46 of the pipe 40 associated with the closable passage opening 16. An outlet 54 at the upper end of the riser 20 lies outside the inner container 4 and is provided with a connection 56 for a sampling line 18, which is routed to a process and analysis module 126 for the sample to be extracted (see FIGS. 6 and 7). The riser 20 can also be considered as a (starting) section of the sampling line 18.

The process and analysis module 126 specifically incorporates a vacuum pump 150 which is connected to the sampling line 18 and through the use of which the sampling line 18, and thus also the inner chamber 6, can be set to a negative pressure relative to the environment. This configuration is described in detail hereinafter.

Figure 6:
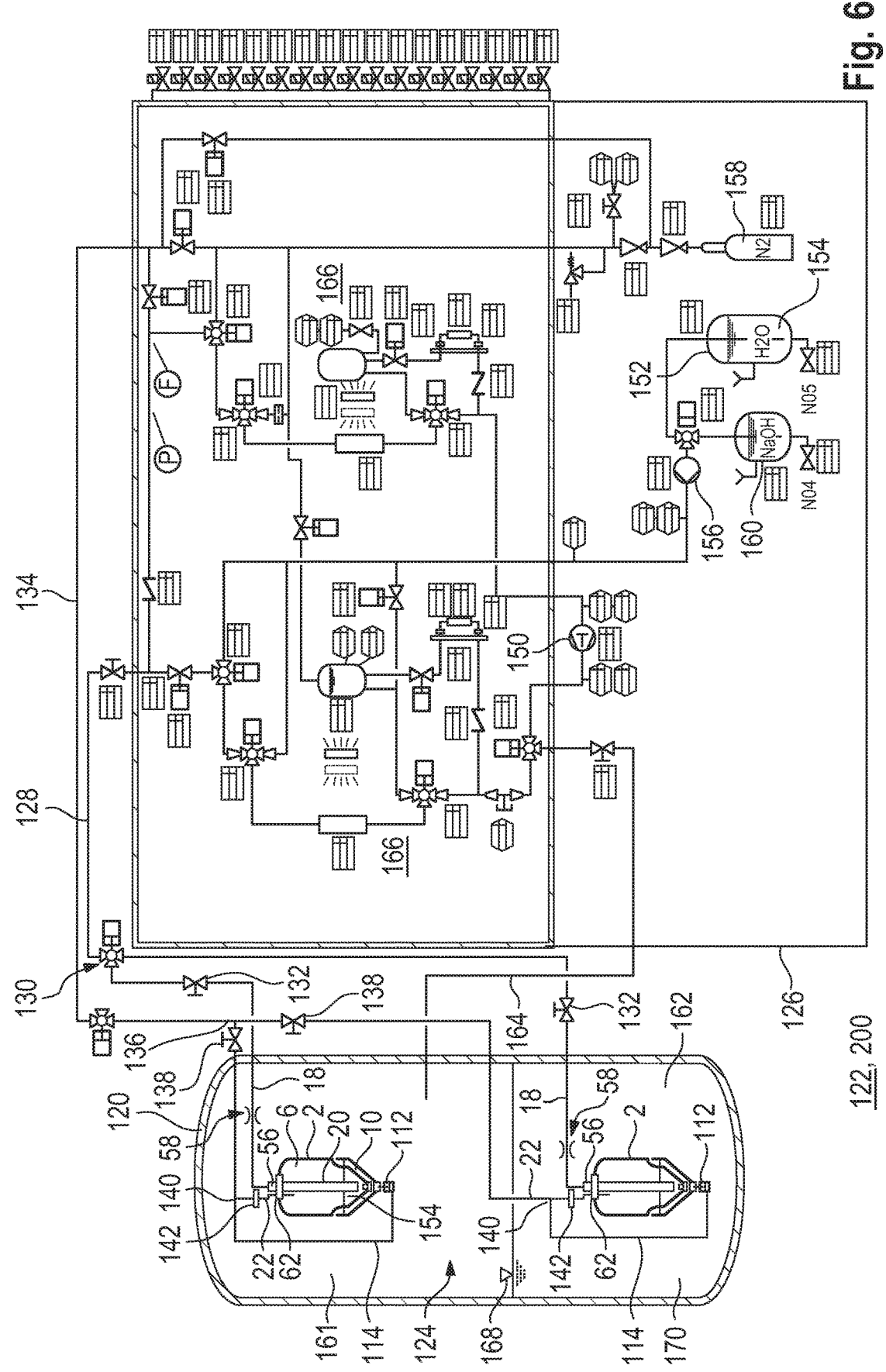
FIG. 6 is an overall schematic and diagrammatic view of a sampling system in a nuclear installation, having a sample container according to FIG. 1.
Figure 7:
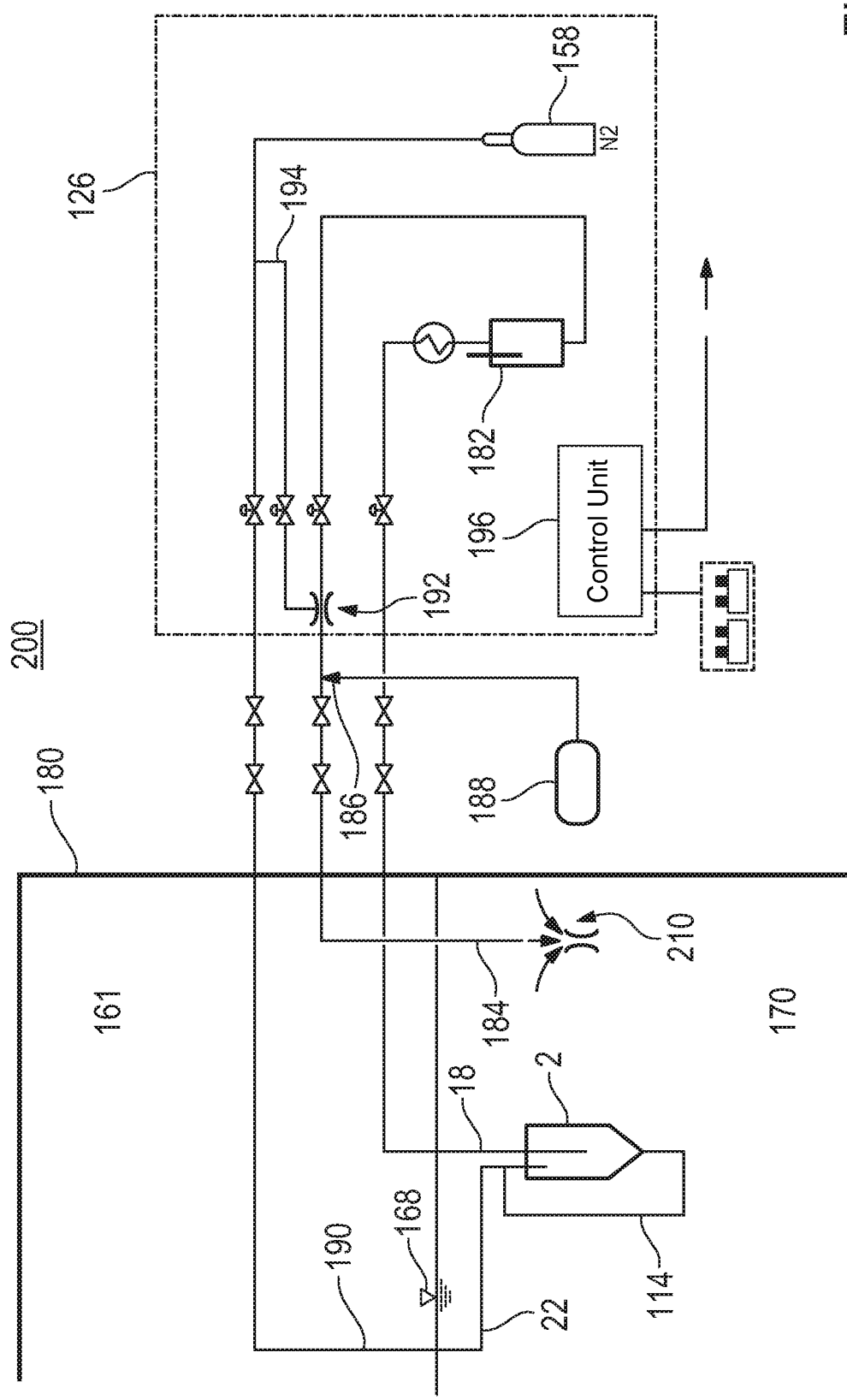
FIG. 7 is a schematic and block diagram of a variant of a sampling system of the type according to the invention.

In an advantageous configuration, a choke valve/choke 58, which is only diagrammatically represented in FIG. 6, is disposed in the sampling line 18. According to one possible variant, it is integrated immediately below the outlet 54 in the riser 20 or in the connection 56, and constitutes a structural unit in combination with the sample container 2. It can also be disposed downstream of the connection 56 in the sampling line 18 but, relative to the overall length thereof, as close as possible at its origin to the sample container 2. The choke 58 is preferably constructed for the critical pressure relief of the medium flowing therein.

Moreover, in order to operate the sample container 2, the conveyor medium line 22 is routed through the cover plate 24 of the inner container 4 into the inner chamber 6, in a pressure-tight and media-tight configuration. To this end, an appropriate bushing 60 is provided in the cover plate 24. In a similar manner to the sampling line 18, a line section can be routed through the cover plate 24, at the upper end of which, outside the inner container 4, a connection 62 is located for the conveyor medium line 22. The line section can also be considered as a (terminal) section of the conveyor medium line 22, which runs from an external conveyor medium source to the sample container 2, and the outlet 64 of which discharges into the inner chamber 6.

Nitrogen, which is preferably employed as a conveyor medium/transport medium/driver medium, is appropriately delivered by using a corresponding nitrogen gas cylinder. Through the use of the conveyor medium, the inner chamber 6 can be exposed to an overpressure, relative to the environment (c.f. the description of FIGS. 6 and 7 hereinafter).

Figure 4:
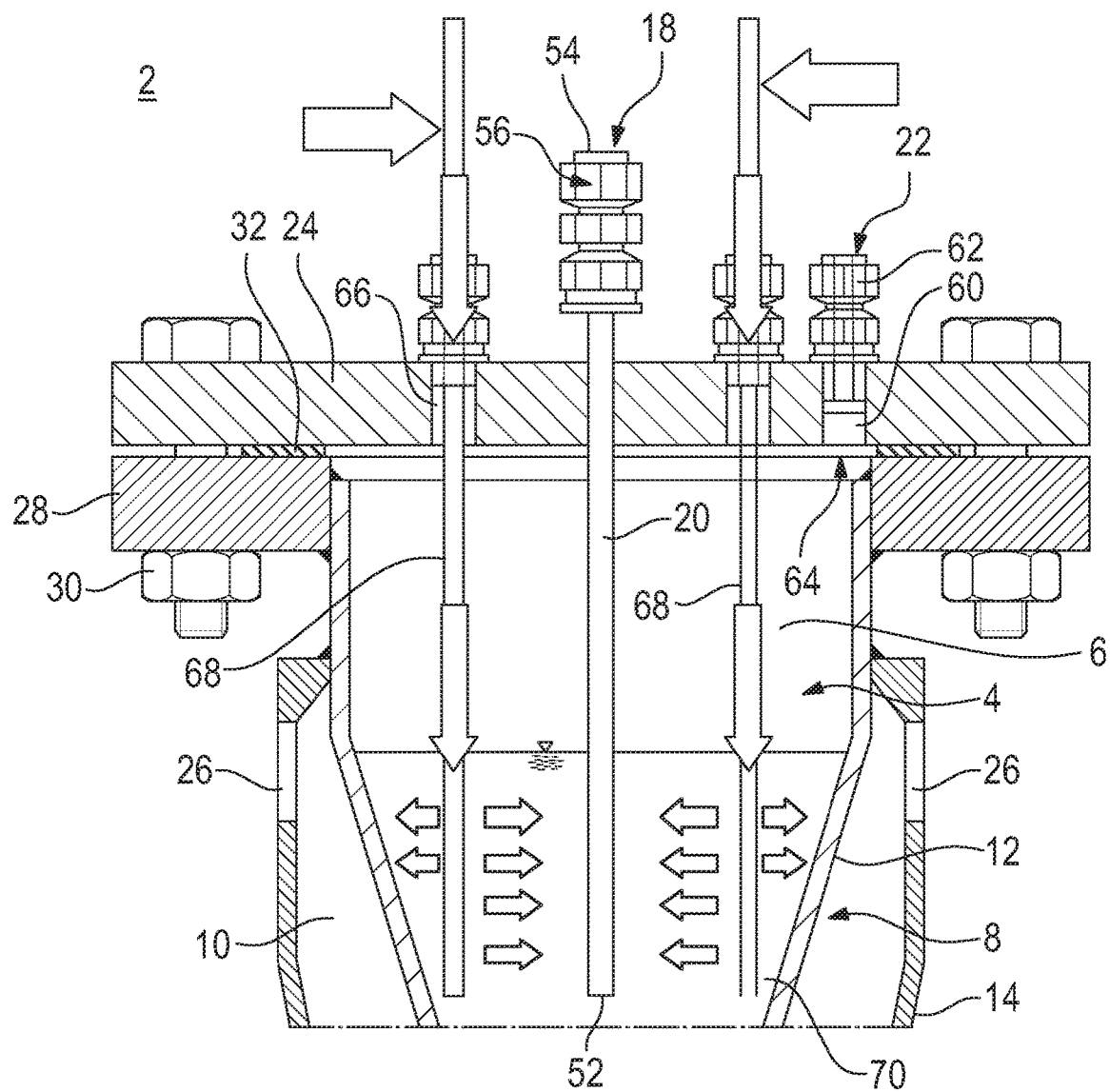
FIG. 4 is an enlarged, longitudinal-sectional view of the sample container of FIG. 1, in an easily-modified configuration.

Finally, in a preferred configuration, the cover plate 24 of the inner container 4 incorporates a further bushing 66 for the accommodation of a thermal conduction pipe 68 which projects into the inner chamber 6. Naturally, as per FIG. 4, a plurality of thermal conduction pipes 68 can also be provided which, by using the thermal transfer medium contained therein, passively conduct heat from the surrounding environment into the inner chamber 6 (as represented herein by the thick arrows). Since the transfer of heat to the liquid phase which lies/accumulates in the base region of the inner chamber 6 is more effective than in the overlying gaseous phase, the thermal conduction pipes 68 are preferably configured to a length which extends to the base region of the inner chamber 6, and generally project into the liquid phase 70.

The respective thermal conduction pipe 68 can specifically be a two-phase thermosiphon or "heat pipe," in which the thermal transfer medium circulates by a natural cycle of vaporization on the heat source (the environment) and condensation on the heat sink (the inner chamber 6). Alternatively or additionally, in a forced circulation configuration, heating pipes or similar which carry a heating medium, for example steam, can also be routed into the inner chamber 6, where they heat the contents thereof in order to prevent condensation in the gaseous phase. In a preferred configuration, in the interests of optimum heat transfer, thermal conduction plates or ribs are fitted to the thermal conduction pipes 68, both inside and outside the sample container 2.

In order to carry out the requisite closure of the closable passage opening 16 from the outer chamber 10 to the inner chamber 6, a closure device 72 is provided, preferably a pneumatic and/or hydraulic closure device, specifically having a pneumatic cylinder.

In the exemplary embodiment according to FIGS. 1 and 3, the closure device 72 incorporates a cylindrical closing piston 74, which is disposed for linear displacement along the central axis M in the base of the outer container 8.

To this end, a base plate 76 of the outer container wall 14 incorporates a cylindrical recess, into which a hollow cylinder 78 which encloses the closing cylinder/closing piston 74 is inserted in a media-tight configuration. At its lower end, the hollow cylinder 78 is closed in a pressure-tight and media-tight manner by an exact-fitting cylindrical end piece 94 which is sealed by using an annular seal 92. The end piece 94, as represented, can be bolted to the cylinder wall of the hollow cylinder 78 by using fixing bolts 96. In the exemplary embodiment, the hollow cylinder 78 in this case includes an upper cylinder section 80, the diameter of which is selected in such a way that a piston shaft 82 of the closing piston 74 is accommodated therein with a limited clearance, and can slide back and forth (in this case, up and down), with the formation of a piston seal. In a lower cylinder section 84, the diameter of the hollow cylinder 78 is enlarged in relation to the upper cylinder section 80. The piston shaft 82 which projects into the lower cylinder section 84 has a constant diameter A over its entire length, such than an annular interspace 86 is formed between the piston shaft 82 and the cylinder wall 108 in the lower cylinder section 84. At the lower end, a radially-projecting and circular closure plate 88 is fitted to the lower end face of the piston shaft 82. The diameter B of the closure plate 88 is configured in such a way that, between the latter and the cylinder wall 108, a narrow gap 90 remains, through which a medium flows. Alternatively, a circumferential projection with a corresponding diameter can be molded-on to the cylindrical piston shaft 82 there, for instance as the closing piston 74 with a corresponding outer profile is formed in a rotating machine or lathe.

In the open setting, the closing piston 74 is located in the lower terminal position which is defined, for example, by an end stop 98 on the underside of the closure plate 88 or on the end piece 94, and is fully-recessed in the base plate 76 of the outer container wall 14. In this setting, the gap 36 and the closable passage opening 16 are clear. In the closed setting, the closing piston 74 is located in the upper terminal position, wherein the upper end face 100 thereof closes the closable passage opening 16. Specifically, for example, an annular sealing zone 102 is formed within the end face 100 at an edge border of the closable passage opening 16. In this sealing zone 102, an annular seal 104, which advantageously projects upwards from the end face 100, is disposed in a groove in the piston shaft 82. The associated diameter of the surface which effectively covers and seals the inlet to the closable passage opening 16 is designated in FIG. 3 as C.

A helical spring 106, which is disposed in the interspace 86, acts as a compression spring and engages at its lower end with the radially projecting overhang on the closure plate 88, and at its upper end with a shoulder between the upper cylinder section 80 and the lower cylinder section 84. The spring force thereof thus endeavors to move the closing piston 74 downwards into the open setting. Another appropriate spring element can naturally be employed in place of the helical spring 106.

In order to move the closing piston 74 to the closed setting, the interspace 86 enclosed between the piston and the cylinder wall in the lower cylinder section 84, which is sealed from the environment in a pressure-tight and media-tight manner, is pressurized by the introduction of an actuation medium, until the upwardly-oriented actuating force outweighs the downwardly-oriented actuating force. To this end, the cylinder wall 108, in the lower cylinder section 84, incorporates a through-hole 110, on the outer side of which a connection 112 for an actuation medium line 114 which carries the actuation medium is disposed. In a specifically preferred configuration, this line branches off from the conveyor medium line 22, in such a way that the conveyor medium can simultaneously be employed as an actuation medium (see below).

In detail, the composition of the forces acting on the closing piston 74 is as follows:

If the closing piston 74 is in the open setting, the upwardly-oriented closing force is given by the product $A_B p_Z$ of the effective piston surface area AB on the closure plate 88 (of diameter B) and the pressure $p_Z$ of the actuation medium in the inter-space 86 of the hollow cylinder 78.

The downwardly-oriented opening force is given by the addition of the spring force $F_F$ of the helical spring 106, a force $A_{B-A} p_Z$ acting from above on the annular surface $A_{B-A}$ of the projection on the closure plate 88 (of external diameter B and internal diameter A), and a force $A_A p_U$ acting from above on the end face $A_A$ (of diameter A) of the closing piston 74, where $p_U$ represents the pressure of the medium in the gap 36 between the inner container 4 and the outer container 8, which substantially equates to the ambient pressure.

In order to move the closing piston 74 to the closed setting, the pressure $p_Z$ of the actuation medium in the interspace 86 is increased until such time as the upwardly-oriented closing force exceeds the downwardly-oriented opening force. When these forces are in equilibrium, the following relationship applies:

$$A_B p_Z = A_{B-A} p_Z + A_A p_U + F_F$$

If this pressure is exceeded in the interspace 86, the closing piston 74 travels, in such a way that it engages with the edge of the passage opening 16 and closes the latter, wherein a seal is formed by the annular seal 104 (of diameter C). With the passage opening 16 closed, a different equilibrium of forces now applies, namely:

$$A_B p_Z = A_{B-A} p_Z + A_C p_I + F_F$$

where $p_I$ represents the pressure in the inner chamber 6 which, in a preferred configuration, is equal to the pressure $p_Z$ in the interspace 86 of the hollow cylinder 78, if one and the same medium is simultaneously employed as an actuation medium for the closing piston 74 and as a conveyor medium for the fluid in the inner chamber 6 (see below).

The operating method of the sample container 2 is described hereinafter with reference to two typical installation situations in a nuclear power plant, as represented in FIG. 6.

To this end, FIG. 6 represents a highly simplified schematic longitudinal section of the safety containment 120 of a nuclear power plant 122. A space enclosed by the safety containment 120 is also itself described as a "containment" 124. In the present exemplary case, two sample containers 2 are installed in the containment 124 and, by using associated line systems, are connected to the process and analysis module 126 which is disposed outside the containment 124.

A sampling line 18, which is routed through the safety containment 120 to the process and analysis module 126, is connected on each of the two sample containers 2 by using the respective connection 56. In the example shown, the two sampling lines 18 combine to form a common outlet line 128, wherein the setting of a switchover valve 130 installed at the junction point determines which of the two sample containers 2 is to be used. Moreover, each line section can be shut off separately by using an isolating valve 132, which is advantageously disposed immediately down-circuit of the penetration in the safety containment 120.

In an analogous manner, by using the connection 62, the conveyor medium line 22, which originates from the process and analysis module 126 and is routed through the safety containment 2, is connected to each of the two sample containers 2. Specifically, in the present exemplary embodiment, there is a common supply line 134 which, at a line bifurcation 136, splits into two sub-sections. In this case again, isolating valves 138 are provided at appropriate locations.

A line, which branches off from the respective conveyor medium line 22 at a line bifurcation 140, is connected to the connection 112 of the sample container 2, and functions as the actuation medium line 114. The nitrogen gas which is preferably employed as a conveyor medium thus assumes a dual function, in that it simultaneously functions as an actuation medium for the closing piston 74. Due to the action of a choke valve 142 which is disposed in the conveyor medium line 22, namely in the line section between the line bifurcation 140 and the connection 62, upon the infeed of the conveyor/actuation medium, the build-up of the actuation pressure acting on the closing piston 74 is more rapid than that of the effective conveyor pressure in the inner chamber 6.

Another conveyor/actuation medium can be employed in place of nitrogen, specifically an inert gas, which shows the least possible interaction with the sample to be extracted and does not corrupt measurements.

The process and analysis module 126 incorporates the vacuum pump 150, which is connectable to the sampling line 18 and is employed as a suction pump, in order to generate a negative pressure in the sampling line 18, and thus also in the inner chamber 6 of the sample container 2, as required. In a suction process of this type, a media flux/sampling stream is established from the sample container 2 to the process and analysis module 126. To some extent, this constitutes a standard case, upon which the terms for "inlet/outlet" etc. selected herein are based. The process and analysis module 126 further incorporates a storage tank 152 for a scrubbing liquid 154, which is connectable to the sampling line 18 in such a way that, when the vacuum pump 150 is switched off or disconnected, by using a conveyor pump 156, the scrubbing liquid 154 can be conveyed through the sampling line 18—against the direction of flow of sampling—to the sample container 2, and into the inner chamber 6 thereof. The scrubbing liquid 154 is preferably an alkaline fluid, specifically, an aqueous fluid with alkaline reagents added which are conducive to iodine separation.

The process and analysis module 126 further incorporates a storage tank for the conveyor medium/actuation medium to be infed to the corresponding supply line 134, as required, preferably in the form of nitrogen, which is stored under high pressure in a compressed gas cylinder 158 (nitrogen cylinder). Separate conveyor pumps or similar can be omitted accordingly. Through the use of pressure reducers and control valves incorporated in the line system, the effective pressure in the sample container 2 can be set and, where applicable, adjusted in accordance with present requirements.

The process and analysis module can also incorporate further storage tanks 160 and conveyor pumps for chemicals which, as required, for the chemical conditioning of the atmosphere in the containment 124, or of the fluid in a sump pit 162, or similar, can be infed to the containment through a separate supply line which is routed through the safety containment 120. Through the use of this supply line and/or a separate return line 164, where applicable, samples extracted can also be returned to the containment 124.

Finally, the process and analysis module incorporates various devices for the pre-treatment, chemical/physical/radiological analysis and, where applicable, intermediate storage or preservation of samples extracted from the containment. For example, liquid or gaseous samples are fed through a separate loop and are diluted therein. The system can also be equipped with measuring devices for nuclide-specific radioactivity measurement, specifically in the form of on-line ("on-the-fly") measurement, and with measuring devices for the determination of gas compositions. Preferably, a probe for the measurement of pH value is also installed within the fluid sampling loop.

A control unit of the process and analysis module 126, preferably with an independent power supply, controls firstly the extraction of samples and the infeed of the conveyor/actuation medium by using various isolating and control valves, and by actuation of the drive unit of the vacuum pump 150, and secondly actuates the various auxiliary and make-up units. The control of measuring and evaluation devices 166 can also be incorporated in the plant control system or, alternatively, can be outsourced to a separate control unit. In general, the process and analysis module 126 can be of modular construction, and can be expanded by the addition of various functional units, as required. A basic module, for example, thus assumes only the supply and actuation functions of those components which are absolutely mandatory for sampling, namely, the vacuum pump, the nitrogen supply and, where applicable, the infeed of scrubbing liquid, whereas further functions are outsourced to auxiliary modules. The above-mentioned sub-functions of the basic module can also be delivered separately.

In the exemplary embodiment according to FIG. 6, one of the two sample containers 2 is configured for the extraction of a gas and aerosol sample from the atmosphere 161 in the containment 2, and is therefore installed at an adequate height. The lower sample container, which is installed below the liquid level 168, is intended for the extraction of a liquid sample from the sump/sump pit 162.

In order to provide for the extraction of a gas sample using the upper of the two sample containers 2, with an open passage opening 16, the scrubbing liquid 154 is firstly fed from a storage tank 152 in the process and analysis module 126 through the sampling line 18 and the riser 20 to the inner chamber 6. As a result of the overpressure thus applied to the inner chamber 6, the scrubbing liquid 154 flows through the closable passage opening 16 into the outer chamber 10. Thereafter, the pressure in the inner chamber 6 is reduced, in such a way that a proportion of the scrubbing liquid 154 flows back through the closable passage opening 16 fitted with the Venturi nozzle 50, to the inner chamber 6. As a result, at least in the base region of the outer chamber 10, and in the base region of the inner chamber 6, a fluid column of scrubbing liquid 154 is formed. A system for the actual execution of sampling is prepared accordingly.

Due to the further reduction of pressure in the sampling line 18, by using the vacuum pump 150, atmospheric air flows from the containment 124 through the passage openings 26 into the outer chamber 10, and from there through the closable passage opening 16 fitted with the Venturi nozzle 50 through the scrubbing liquid 154 into the inner chamber 6. Water-soluble constituents of air are dissolved in the scrubbing liquid 154. Aerosols entrained in the air stream are likewise captured in the scrubbing liquid 154. Non-water-soluble gaseous constituents pass upwards through the riser 20, are extracted through the sampling line 18 and routed to the measuring and analysis devices 166 of the process and analysis module 126.

During this process, passive heating of the scrubbing liquid 154 in the inner chamber 6 occurs by using the ambient heat, delivered by the thermal conduction pipes 68, for the minimization of condensation.

Moreover, the through flow in the sampling line 18 is maintained constant by the supercritical flow-through choke 58, which is located in the sampling line 18 in the immediate vicinity of the sample container 2.

Through the use of pressure measurement in the process and analysis module 126, the atmospheric pressure in the containment 124 can be determined. The pressure is measured statically, i.e. with no through flow. The temperature in the containment 124 is also measured by using appropriate sensors. The partial pressure of water vapor in the containment 124 can be determined accordingly. By the comparison of the measured through flow in the sampling line 18 and the analytically-determined through flow of the supercritical flux, the proportion of water vapor which is condensed in the transmission path can be determined. The flux of the gas stream in the scrubbing liquid 154 can be determined accordingly, and the radioactivity present in the scrubbing liquid 154 can be related to the volume thereof (Bq/m3).

As a result of these measures, no heating of the sampling line 18/128 is required for gas sampling.

After the gas sampling, the closable passage opening 16 is closed by using the closing piston 74. To this end, as already described in detail, pressure is applied to the interspace 86 of the closing piston 74, through the actuation medium line 114 by the introduction of pressurized nitrogen until the closing piston 74 is moved upwards into the closing position. By a further increase in pressure in the supply line 134, which carries nitrogen and which branches into the actuation medium line 114 and the conveyor medium line 22, pressure is applied to the inner chamber 6 by using the conveyor medium line 22, in such a way that the fluid sample extracted from the scrubbing liquid 154 through the riser 20 is conveyed through the sampling line 18 in the form of a plug. To some degree, the nitrogen employed as a conveyor medium propels the plug ahead of itself. In this manner, the fluid sample can be conveyed with a continuously effective conveyor pressure, even over comparatively long distances of 100 m or more, to the process and analysis module 126 where, specifically, an analysis of the airborne radioactivity (aerosols) entrained from the containment atmosphere by the previous through flow of gas therein can be executed.

During transport by using the nitrogen blanket, the vacuum pump 150 is advantageously switched off/disconnected from the sampling line 18 but, alternatively, can also be simultaneously in service.

The evaluated sample can then be fed back to the containment 124 through the return line 164.

After the completion of sampling, by using pressure relief in the nitrogen-carrying lines 22, 114 and, where applicable, by back flushing with the scrubbing liquid, the system can be restored to its initial state and employed for further sampling.

The sample container 2 ("pool sampler") disposed in the lower part of FIG. 6 in a sump pit 162 of the containment 124, or in any other pit containing the liquid phase/liquid 170, has an identical construction to the upper sample container 2 disposed in the gaseous phase/atmosphere 161, and is also connected to the process and analysis module 126 in the same manner by using the associated line system. For the direct sampling of the liquid 170 contained in the pit, by the application of a slight negative pressure to the sampling line 18, an influx of liquid 170 from the outer chamber 10 to the inner chamber 6 can be initiated. The negative pressure can be generated by a vacuum pump 150 which is disposed in the process and analysis module 126 or at another location. Thereafter, as described above with reference to the other sample container 2, the closing piston 74 is moved to the closing position by the application of nitrogen pressure, and the inner chamber is closed accordingly. Finally, by the application of pressure to the inner chamber 6, using nitrogen which is delivered through the conveyor medium line 22, a liquid sample is conveyed through the sampling line 18 to the process and analysis module 126.

The sample can specifically be extracted from a boiling liquid 170 in the sump or pit and conveyed by using nitrogen. To this end, the setting of the conveyor pressure is higher than the saturated vapor pressure of the liquid 170 in the sump.

A variant of such a system for the extraction of samples from a boiling pit/pool is represented in FIG. 7, using the example of a condensation chamber 180 of a boiling water reactor. Since there is no configuration for sampling from the gaseous phase/atmosphere 161 in this case, a comparatively small negative pressure in the inner chamber 6 of the sample container 2 is sufficient for the filling thereof with liquid 170. A gas jet pump is sufficient for this purpose.

Specifically, in the exemplary embodiment, the sampling line 18 which is connected to the sample container 2 is routed through the wall of the condensation chamber 180 and/or through the safety containment to a process and analysis module 126. Herein, the liquid sample extracted is passed through a measuring module 182 for the determination of pH value, which is actuated/controlled by the control unit 196 and—propelled by the nitrogen blanket which is conveyed through the nitrogen line 190—is then conveyed back to the condensation chamber 180 through the return line 184. In the return flux, for example by using an injection nozzle 186, as required, a chemical reagent, e.g. caustic soda, is extracted from a storage tank 188 and injected for the regulation/control of the pH value of the pool liquid 170. The outlet end of the return line 184 is preferably configured as an injection nozzle/jet injector 210, whereby the injected media stream entrains and agitates the surrounding pool liquid 170, in the interests of mixing and homogenization.

In order to perform the short-term generation of a negative pressure in the sample container 2 during the filling thereof with pool liquid 170, a jet pump 192 is provided, which is disposed in the sampling line 18 or, as represented herein, in the return line 184. Nitrogen, which is preferably employed as a conveyor medium for the jet pump 192, is supplied from a compressed gas cylinder 158. To this end, in a specifically preferred configuration, a branch line 194 is tapped-off from the nitrogen line 190, which is connected to the conveyor medium connection of the jet pump 192. Through the use of appropriately disposed setting and control valves, a switchover between the various operating modes can be executed.

The following is a summary list of reference numerals and the corresponding structure used in the above description of the invention:

LIST OF REFERENCE SYMBOLS

2 Sample container
4 Inner container
6 Inner chamber
8 Outer container
10 Outer chamber
12 Inner container wall
14 Outer container wall
16 Closable Passage Opening
18 Sampling line
20 Riser
22 Conveyor medium line
24 Cover plate
26 Passage opening
28 Flange
30 Fixing bolt
32 Sealing ring
34 Base
36 Gap
38 Base plate
40 Nozzle pipe
42 Flow channel
44 Inlet opening
46 Outlet opening
47 Inlet cone
48 Outlet cone
49 Intake slot
50 Venturi nozzle
51 Baffle plate
52 Inlet
54 Outlet
56 Outlet
58 Choke
60 Bushing
62 Connection
64 Outlet 66 Bushing
68 Thermal conduction pipe
70 Liquid phase
72 Closure device
74 Closing piston
76 Base plate
78 Hollow cylinder
80 Upper cylinder section
82 Piston shaft
84 Lower cylinder section
86 Interspace
88 Closure plate
90 Gap
92 Annular seal
94 End piece
96 Fixing bolt
98 End stop
100 End face
102 Sealing zone
104 Annular seal
106 Helical spring
108 Cylinder wall
110 Through-hole
112 Connection
114 Actuation medium line
120 Safety containment
122 Nuclear power plant
124 Containment
126 Process and analysis module
128 Outlet line
130 Switchover valve
132 Isolating valve
134 Supply line
136 Line bifurcation
138 Isolating valve
140 Line bifurcation
142 Choke valve
150 Vacuum pump
152 Storage tank
154 Scrubbing liquid
156 Conveyor pump
158 Compressed gas cylinder
160 Storage tank
161 Atmosphere
162 Sump pit
164 Return line
166 Measuring and evaluation device
168 Liquid level
170 Fluid
180 Condensation chamber
182 Measuring module
184 Return line
186 Injection nozzle
188 Storage tank
190 Nitrogen line
192 Jet pump
194 Branch line
196 Control unit
200 Sampling system
210 Jet injector
A,B,C Diameters
M Central axis

The invention claimed is:

1. A sample container for obtaining an environmental sample, the sample container comprising:
   an outer chamber having a base region;
   an outer container wall surrounding said outer chamber, said outer container wall having at least one passage opening formed therein, said at least one passage opening directly fluidically connecting said outer chamber to the environment for filling said outer chamber with a liquid at least in said base region;
   an inner chamber having a connection for a sampling line and a connection for a conveyor medium line and said inner chamber otherwise being sealed from the environment in a pressure-tight and media-tight manner;
   an inner container wall surrounding said inner chamber, said inner container wall having a closable passage opening disposed therein forming a fluidic connection between said inner chamber and said base region of said outer chamber, said closable passage opening between said outer chamber and said inner chamber being constructed as a Venturi nozzle; and
   a pneumatically or hydraulically actuatable closure device for said closable passage opening between said outer chamber and said inner chamber, said closure device having a connection for an actuation medium line.

2. The sample container according to claim 1, wherein said closure device includes a hollow cylinder and a closing piston being moveable in said hollow cylinder between an opening position and a closing position.

3. The sample container according to claim 2, which further comprises a spring element having a spring force and having a resting state setting said closing piston to said opening position, said closing piston moving against said force of said spring element into said closing position in an event of a sufficient pressure in an actuation medium in said actuation medium line.

4. The sample container according to claim 1, wherein said outer container wall has a base plate, and said closure device is disposed in said base plate.

5. The sample container according to claim 1, which further comprises a riser projecting into said inner chamber, said connection for said sampling line being connected to said riser.

6. The sample container according to claim 1, which further comprises at least one heat transfer pipe projecting into said inner chamber for transferring heat from the environment to said inner chamber.

7. A sampling system, comprising:
   a sample container according to claim 1;
   a vacuum pump;
   said sampling line connecting said vacuum pump to said inner chamber of said sample container;
   a compressed gas source;
   said conveyor medium line connecting said compressed gas source to said inner chamber of said sample container; and
   said actuation medium line disposed on said closure device of said sample container and connected to said compressed gas source.

8. The sampling system according to claim 7, wherein said actuation medium line branches off from said conveyor medium line permitting a conveyor medium to simultaneously function as an actuation medium for said closure device.

9. The sampling system according to claim 8, wherein the conveyor medium is nitrogen gas.

10. The sampling system according to claim 7, which further comprises a supercritical flow-through choke disposed in said sampling line for maintaining a constant volumetric flow through said sampling line.

11. The sampling system according to claim 7, wherein said vacuum pump is a jet pump.

12. A nuclear power plant, comprising:
a safety containment having an interior;
a process and analysis module disposed outside said safety containment; and
a sampling system including:
at least one sample container according to claim 1 disposed in said interior of said safety containment;
a vacuum pump;
said sampling line connecting said vacuum pump to said inner chamber of said sample container;
a compressed gas source;
said conveyor medium line connecting said compressed gas source to said inner chamber of said sample container; and
said actuation medium line disposed on said closure device of said sample container and connected to said compressed gas source.

13. A method for operating a sampling system, the method comprising the following steps:
providing a sample container according to claim 1;
providing a vacuum pump;
using said sampling line to connect said vacuum pump to said inner chamber of said sample container;
providing a compressed gas source;
using said conveyor medium line to connect said compressed gas source to said inner chamber of said sample container;
providing said actuation medium line on said closure device of said sample container and connected to said compressed gas source; and
extracting a gas sample by applying a negative pressure to said sampling line upon said closable passage opening between said outer chamber and said inner chamber being open.

14. The method according to claim 13, which further comprises using a scrubbing liquid to convey the gas sample upon a transition of the gas sample from said outer chamber to said inner chamber.

15. The method according to claim 14, which further comprises using said sampling line to feed the scrubbing liquid into said sample container prior to sampling.

16. The method according to claim 13, which further comprises extracting an aerosol sample by firstly conveying a gas sample into the sample container by using a scrubbing liquid and then extracting a liquid sample from the scrubbing liquid.

17. The method according to claim 13, which further comprises applying pressure to said actuation medium line to close said closure device.

18. A method for operating a sampling system, the method comprising the following steps:
providing a sample container according to claim 1;
providing a vacuum pump;
using said sampling line to connect said vacuum pump to said inner chamber of said sample container;
providing a compressed gas source;
using said conveyor medium line to connect said compressed gas source to said inner chamber of said sample container;
providing said actuation medium line on said closure device of said sample container and connected to said compressed gas source; and
compressing a fluid sample through said sampling line by applying an overpressure to said conveyor medium line upon said closable passage opening between said outer chamber and said inner chamber being closed.

19. The method according to claim 18, which further comprises extracting an aerosol sample by firstly conveying a gas sample into the sample container by using a scrubbing liquid and then extracting a liquid sample from the scrubbing liquid.

20. The method according to claim 18, which further comprises applying pressure to said actuation medium line to close said closure device.

* * * * *